(12) United States Patent
Zaps et al.

(10) Patent No.: US 9,413,202 B2
(45) Date of Patent: Aug. 9, 2016

(54) STATOR FOR AN ELECTRIC MOTOR

(75) Inventors: Klaus Zaps, Volkach-Astheim (DE); Peter Hauck, Gerbrunn (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 847 days.

(21) Appl. No.: 13/322,780

(22) PCT Filed: May 28, 2010

(86) PCT No.: PCT/EP2010/003243
§ 371 (c)(1),
(2), (4) Date: Feb. 15, 2012

(87) PCT Pub. No.: WO2010/136206
PCT Pub. Date: Dec. 2, 2010

(65) Prior Publication Data
US 2012/0299400 A1 Nov. 29, 2012

(30) Foreign Application Priority Data
May 29, 2009 (DE) .......................... 10 2009 023 231

(51) Int. Cl.
H02K 3/34 (2006.01)
H02K 3/52 (2006.01)
H02K 15/06 (2006.01)

(52) U.S. Cl.
CPC .............. *H02K 3/522* (2013.01); *H02K 15/066* (2013.01); *Y10T 29/49009* (2015.01)

(58) Field of Classification Search
CPC ..................................................... H02K 3/522
USPC ......................................... 310/260, 270, 208
See application file for complete search history.

(56) References Cited

U.S. PATENT DOCUMENTS 2,655,613 A * 10/1953 Wieseman ............... H02K 3/18
                                                    310/191
4,816,710 A * 3/1989 Silvaggio et al. ............. 310/194
(Continued)

FOREIGN PATENT DOCUMENTS

DE         19961339        7/2001
DE         20204507 U1     6/2002
(Continued)

OTHER PUBLICATIONS

PCT International Search Report and Written Opinion, from International Application No. PCT/EP2010/003243 mailed Jun. 27, 2011, 9 pgs.
(Continued)

*Primary Examiner* — Naishadh Desai
(74) *Attorney, Agent, or Firm* — Pauly, Devries Smith & Deffner, LLC

(57) ABSTRACT

The invention relates to a stator for an electric motor having a base body composed of stator laminates which are axially in layers with respect to a motor axis and having a number of frame-like coil formers which are fitted with stator windings, with the coil cross-sectional surfaces of said frame-like coil formers essentially being directed at the motor axis. It is proposed that in order to fit them, the coil formers can first of all be placed obliquely with respect to a final position on coil former holders of the base body and can then be aligned in the final position, and in that the arrangement is designed such that the alignment involves axial bracing of the stator laminates.

21 Claims, 5 Drawing Sheets

(56) References Cited

U.S. PATENT DOCUMENTS

| | | | | |
|---|---|---|---|---|
| 4,990,810 | A | * | 2/1991 | Newhouse .................... 310/194 |
| 5,285,563 | A | * | 2/1994 | Nove et al. ...................... 29/596 |
| 6,057,625 | A | * | 5/2000 | Stockman et al. ............ 310/215 |
| 6,177,751 | B1 | * | 1/2001 | Suzuki ................... H02K 1/148 |
| | | | | 310/194 |
| 7,291,955 | B2 | * | 11/2007 | Otsuji ........................... 310/194 |
| 7,586,231 | B2 | * | 9/2009 | Wang et al. ................... 310/260 |
| 2008/0296996 | A1 | * | 12/2008 | Wang et al. ................... 310/260 |
| 2010/0066198 | A1 | * | 3/2010 | Fubuki et al. ................ 310/208 |

FOREIGN PATENT DOCUMENTS

| | | | |
|---|---|---|---|
| EP | 1168570 | | 1/2002 |
| JP | 10322940 | | 12/1998 |
| JP | 2008220093 A | * | 9/2008 |
| WO | WO 2008108317 A1 | * | 9/2008 ............. H02K 15/06 |
| WO | 2009016196 | | 2/2009 |

OTHER PUBLICATIONS

Search Report for Chinese Patent Application No. 201080033844.6 related to U.S. Appl. No. 13/322,780, mailed Jun. 3, 2013 (2 pages).

Search Report for German Patent Application No. 102009023231.1 related to U.S. Appl. No. 13/322,780, mailed Jan. 14, 2010 (4 pages).

* cited by examiner

STATOR FOR AN ELECTRIC MOTOR

CROSS REFERENCE TO RELATED APPLICATIONS

This application is a national stage application under 35 U.S.C. 371 of International Patent Application Serial No. PCT/EP2010/003243, entitled "STATOR FOR AN ELECTRIC MOTOR," filed May 28, 2010, which claims priority from German Patent Application No. 10 2009 023 231.1, filed May 29, 2009, the disclosures of which are incorporated herein by reference.

FIELD OF THE INVENTION

The present invention relates to a stator for an electric motor, to an electric motor having a stator, and to a method for production of a stator.

BACKGROUND OF THE INVENTION

The stator under discussion is associated with an electric motor and interacts with a rotor. The stator is used in an entirely general form to produce a magnetic field which causes the rotor to rotate.

In order to produce the above magnetic field, the stator is equipped with a number of stator windings, which are arranged on a base body of the stator. The base body consists of laminated stator laminates and is used on the one hand to pass on the magnetic flux produced by the stator windings, and on the other hand to mechanically hold the stator windings. The base body, which is generally in the form of a so-called stator star, in turn normally interacts with a yoke pack. The yoke pack ensures that a closed magnetic flux path is produced.

The known stator (DE 199 61 339 A1), on which the invention is based, discloses the design mentioned above. In this case, the stator windings are arranged on a number of frame-like coil formers, with the coil cross-sectional surfaces of the coil formers being directed essentially at the motor axis. The coil formers are plugged onto the base body, which is in the form of a stator star. In this case, the coil formers each have cross-sectional constrictions in order to allow the coil formers to be latched to the stator star. This allows initial assembly of the base body together with the coil formers.

One disadvantage of the known stator is the fact that the mechanical connection between the base body and the coil formers is not adequate in the axial direction. Particularly when handling the stator during the course of initial assembly, the lack of axial security leads quite frequently to undesirable incorrect positioning or even to detachment of individual stator laminates.

SUMMARY OF THE INVENTION

The above situation can be improved to a certain extent by providing a certain radial interlock between the stator laminates by links produced by stamping and bending, counteracting any relative movement between the stator laminates. However, satisfactory results can also not be achieved in this way, because of the lack of axial security.

Furthermore, the known stator is subject to the problem that, because the stator laminates are subject to tolerances, it is impossible to preclude the possibility of there being air gaps between the laminates, and these gaps have a negative influence on the desired guidance of the magnetic flux.

The invention is based on the problem of refining and developing the known stator such that the assembly capability is optimized, in the sense of a reproducible operating electric motor behaviour.

In the case of a stator for an electric motor having a base body composed of stator laminates which are axially in layers with respect to a motor axis and having a number of frame-like coil formers which are fitted with stator windings, with the coil cross-sectional surfaces essentially being directed at the motor axis, the above problem is solved by placing the coil formers obliquely with respect to a final position on coil former holders of the base body and aligning the coil formers in the final position, wherein the arrangement is designed such that the alignment involves axial bracing of the stator laminates.

One essential feature is that the fitting of the coil formers to the base body can involve axial bracing of the stator laminates, by virtue of an appropriate design. In detail, the invention provides that, in order to fit them, the coil formers can first of all be placed obliquely with respect to a final position on coil former holders of the base body and can then be aligned in the final position. In this case, the arrangement is designed such that the alignment involves axial bracing of the stator laminates. With appropriate lever ratios, axial bracing of the stator laminates can be achieved, with a very considerable clamping force, while only a small alignment force need be applied.

In one embodiment, the change in the alignment force during alignment to a clamping force is achieved in a simple manner in that an appropriate pivoting stud is provided on the internal face of the frame on each of the coil formers. This allows an optimum lever step-ratio to be achieved for the elongated configuration of the coil former.

For tolerance compensation and/or for fixing of the coil formers in the final position, the coil formers are designed to be flexible, in particular on the frame inner face which is axially opposite the pivoting stud and, in particular, to have crushing ribs. Provision of flexibility on only one of the axially opposite frame internal faces has the advantage that the frame internal face which is not flexible ensures a defined axial position of the coil formers. The frame internal face which is not flexible is then preferably located on the connecting face or connection face of the stator.

According to a further teaching, which is important in its own right, the above problem is solved by an electric motor. The electric motor according to the proposal is equipped with the above stator and, in addition, has the normal components such as a stator pack or the like. Reference is made to the statements relating to the stator according to the proposal, in their entirety.

According to a further teaching, which likewise is important in its own right, the above problem is solved by a method. One essential feature of the method according to the proposal is the fact that, in order to fit them, the coil formers are first of all placed obliquely with respect to a final position on coil former holders of the base body and can then be aligned in the final position, and that the alignment involves axial bracing of the stator laminates.

In one embodiment, the invention provides a stator for an electric motor having a base body composed of stator laminates which are axially in layers with respect to a motor axis and having a number of frame-like coil formers which are fitted with stator windings, with the coil cross-sectional surfaces essentially being directed at the motor axis, wherein, in order to fit them, the coil formers can first of all be placed obliquely with respect to a final position on coil former holders of the base body and can then be aligned in the final position, and wherein the arrangement is designed such that the alignment involves axial bracing of the stator laminates.

In another embodiment, the coil former holders additionally project from the base body, essentially in the form of a star with respect to the motor axis. In another embodiment, the alignment in each case involves a pivoting movement about a corresponding pivoting axis, preferably wherein the respective pivoting axis is aligned essentially at right angles to the motor axis.

In another embodiment, when the coil formers are first fitted, the coil cross-sectional surfaces are each inclined with respect to the motor axis, and/or wherein, in the final position, the coil cross-sectional surfaces run essentially parallel to the motor axis.

In another embodiment, when the coil formers are first fitted, the axially opposite frame internal faces of each of the coil formers engage essentially in an interlocking manner with the coil former holders.

In another embodiment, the coil formers are elongated and, in the final position, extend parallel to the motor axis, preferably wherein the coil former holders are essentially cuboid.

In another embodiment, one of the axially opposite frame internal faces of the coil formers in each case has a pivoting stud or the like, over which the coil formers roll during alignment on the base body, preferably wherein the pivoting stud determines the position of the pivoting axis for the pivoting movement during alignment, furthermore preferably wherein the pivoting stud is arranged on the radially outer area of the respective frame internal face with respect to the motor axis.

In another embodiment, the rolling of the coil formers on the respective coil former holder over the pivoting stud leads to axial lifting of the frame internal face, which has the pivoting stud, in addition with respect to the base body, and therefore to bracing of the stator laminates.

In another embodiment, an alignment force, which is applied for alignment to a frame section which is remote from the pivoting axis, causes a resultant clamping force, which acts on the base body from the frame section which is remote from the pivoting axis. In one embodiment, with respect to the pivoting axis, the lever arm which is associated with the alignment force is greater than the lever arm which is associated with the clamping force, preferably wherein the factor between the lever arms is greater than 2, in particular greater than 3.

In one embodiment, the frame internal face which is axially opposite the pivoting stud has a clamping stud, and the two studs are arranged radially offset with respect to one another, with respect to the motor axis.

In one embodiment, the alignment involves plastic and/or elastic deformation of the base body and/or of the respective coil former.

In another embodiment, the coil formers are flexible, preferably plastically deformable, in particular on the frame internal face which is axially opposite the pivoting stud, for tolerance compensation and/or for fixing of the coil formers in the final position, and in particular have crushing ribs, preferably wherein the pivoting stud and/or the clamping stud are/is plastically deformable and in particular have or has crushing ribs.

In one embodiment, the invention provides an electric motor having a stator, with the stator having a base body composed of stator laminates which are axially in layers with respect to the motor axis, and having a number of frame-like coil formers which are fitted with stator windings, with the coil cross-sectional surfaces being directed essentially at the motor axis, wherein, in order to fit them, the coil formers can first of all be placed obliquely with respect to a final position on coil former holders of the base body and can then be aligned in the final position, and wherein the arrangement is designed such that the alignment involves axial bracing of the stator laminates.

In another embodiment, the invention provides a method for production of a stator for an electric motor having a base body composed of stator laminates which are axially in layers with respect to a motor axis and having a number of frame-like coil formers which are fitted with stator windings, with the coil cross-sectional surfaces of the stator windings essentially being directed at the motor axis, wherein, in order to fit them, the coil formers can first of all be placed obliquely with respect to a final position on coil former holders of the base body and can then be aligned in the final position, and wherein the alignment involves axial bracing of the stator laminates.

All the statements relating to the stator according to the proposal, which are suitable for explaining the above method in more detail, to this extent apply as appropriate.

BRIEF DESCRIPTION OF THE FIGURES

The invention will be explained in more detail in the following text with reference to one exemplary embodiment. In the drawing.

DETAILED DESCRIPTION

The illustrated stator for an electric motor interacts in the normal manner with a rotor which is not illustrated. The fundamental method of operation has been explained in the introductory part of the description. Furthermore, a yoke pack, which is likewise not illustrated, is associated with the stator. In this context as well, reference may be made to the introductory part of the description.

The above electric motor is preferably used in a motor vehicle. Fields of application are particularly preferably electrical steering drives and electrical braking systems.

The stator has a base body 1 which is designed to be rotationally symmetrical with respect to the motor axis 2. The base body 1 consists of stator laminates 3 which are axially in layers with respect to the motor axis 2. The stator laminates 3 are indicated only in places in FIGS. 1 and 3.

In order to counteract radial movement of the stator laminates 3, provision is preferably made here for the stator laminates 3 to be linked to one another in a radially interlocking manner by stamping and bending. In the illustrated exemplary embodiment, this is achieved by appropriate shaped areas 3a in the form of passages.

Figure 1:
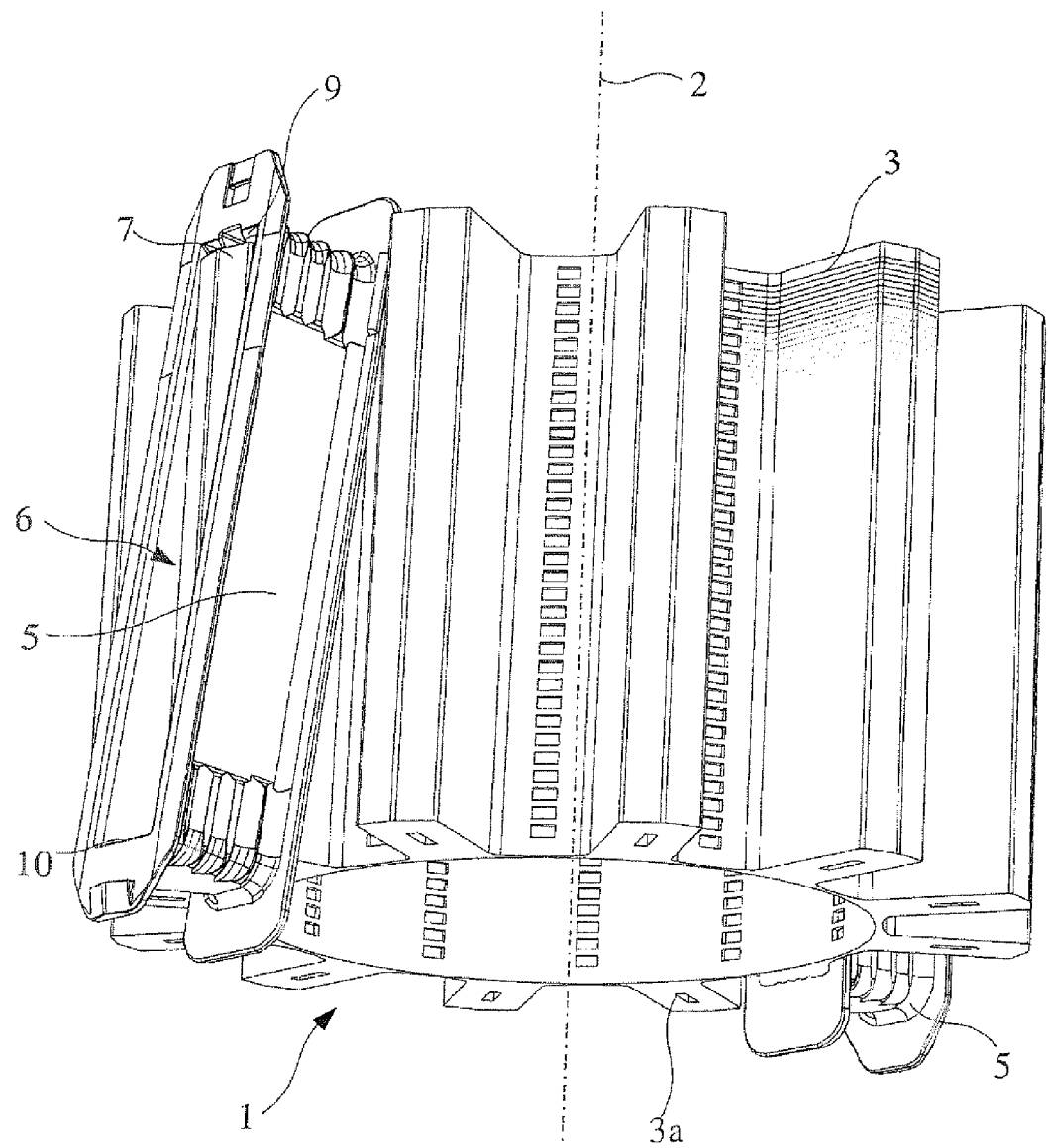
FIG. 1 shows a stator according to the proposal having a coil former (on the right) in the final position and having a coil former (on the left) in the obliquely fitted state.
Figure 2:
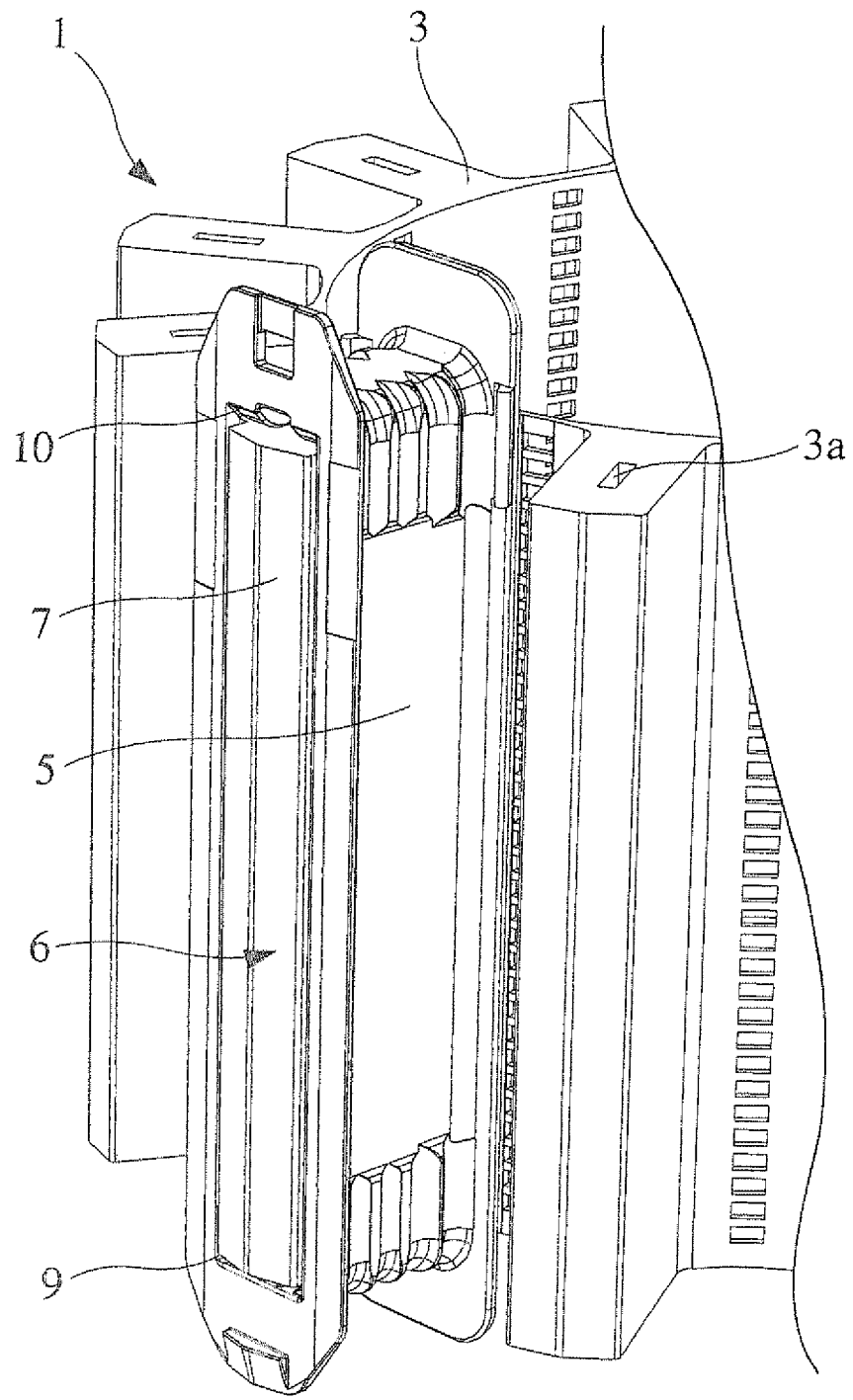
FIG. 2 shows the stator as shown in FIG. 1 having a coil former in the fitted state.

The stator has a number of frame-like coil formers 5 which are fitted with stator windings 4. The stator windings 4 are indicated only in FIG. 3, for the right-hand coil former 5. The coil cross-sectional surfaces 6 are directed essentially at the motor axis 2. In this case, the coil formers 5 and therefore the stator windings 4 are preferably arranged distributed uniformly over the circumference of the stator. In order to improve the illustration, only two coil formers 5 (FIG. 1) and one coil former 5 (FIG. 2) are illustrated in FIGS. 1 and 2.

One advantage associated with the above use of coil formers 5 is the fact that the stator windings 4 can be fitted to the coil formers 5 before the coil formers 5 are placed on the base body 1. This is advantageous from the production-engineering point of view.

One essential feature of the stator illustrated in the drawing is, however, the fact that the coil formers 5 can be fitted in a particularly advantageous manner. This is because, in order to fit them, the coil formers 5 can first of all be fitted to coil former holders 7 on the base body 1 obliquely with respect to the final position illustrated in FIG. 2. This oblique fitting is illustrated on the left in FIG. 1. The coil formers 5 can then be aligned in the final position. This alignment corresponds to a movement of the coil former 5 from the initial assembly position illustrated on the left in FIG. 1 to the final position illustrated in FIG. 2.

In the present case, the fact that the arrangement is designed such that the above alignment of the coil former 5 involves axial bracing of the stator laminates 3 is particularly important. The specific way in which this is done will be explained in detail further below.

The base body 1 of the stator is preferably a stator star, in which the coil former holders 7 additionally project from the base body 1 essentially in the form of a star with respect to the motor axis 2. In an arrangement such as this, the coil former holders 7 are also referred to as "poles".

The coil formers 5 are preferably initially fitted to the coil former holders 7 in a radial direction with respect to the motor axis 2, with the alignment preferably in each case involving a pivoting movement about a corresponding pivoting axis 8. It can be seen best from the illustration in FIG. 3 that the respective pivoting axis 8 here is preferably aligned essentially at right angles to the motor axis 2.

Figure 3:
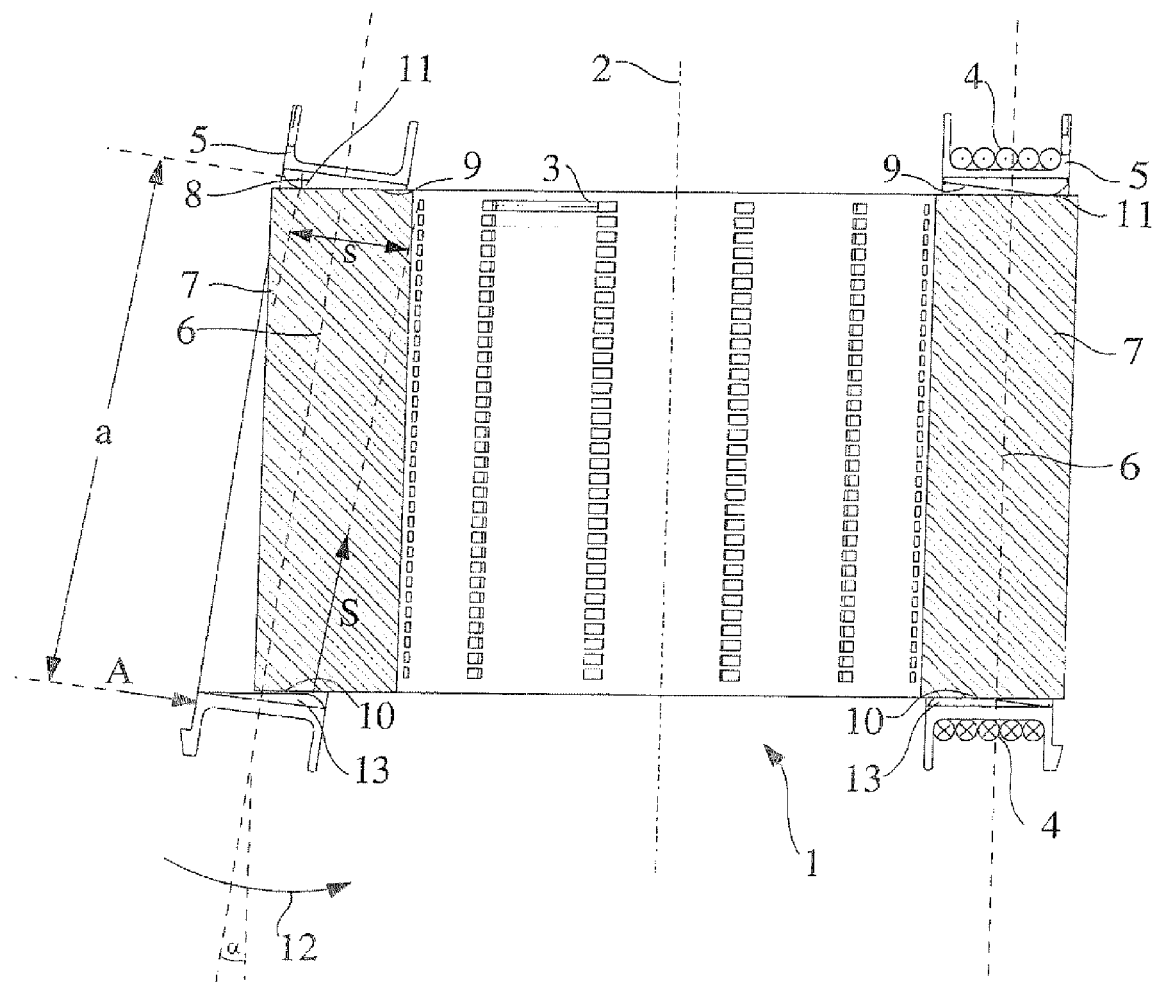
FIG. 3 shows the stator as shown in FIG. 1, in the form of a section view along a section plane aligned vertically in FIG. 1.

The illustration in FIG. 3 also shows that, when the coil formers 5 are first fitted, the coil cross-sectional surfaces 6 are each inclined with respect to the motor axis 2. This is indicated in the illustration shown in FIG. 3 by an inclination angle $\alpha$. In the final position, that is to say in the assembled state, the coil cross-sectional surfaces 6 then run essentially parallel to the motor axis 2.

The fact that, in the case of the illustrated and to this extent preferred exemplary embodiment, when the coil formers 5 are first fitted, the axially opposite frame internal faces 9, 10 of the coil formers 5, except for a certain amount of installation play, now engage essentially in an interlocking manner with the coil former holders 7 is now of interest. This interlock is shown in FIG. 3 for the left-hand, obliquely fitted, coil former 5. As can be seen from this illustration, alignment of the coil former 5 in the final position involves tilting of the coil former 5 on the base body 1 and, in the end, bracing of the stator laminates 3.

In order to achieve a high clamping force, the fact that the coil formers 5 are elongated and extend essentially parallel to the motor axis 2 in the final position is particularly advantageous. In this case, the coil former holders 7 are preferably correspondingly essentially cuboid.

Figure 4:
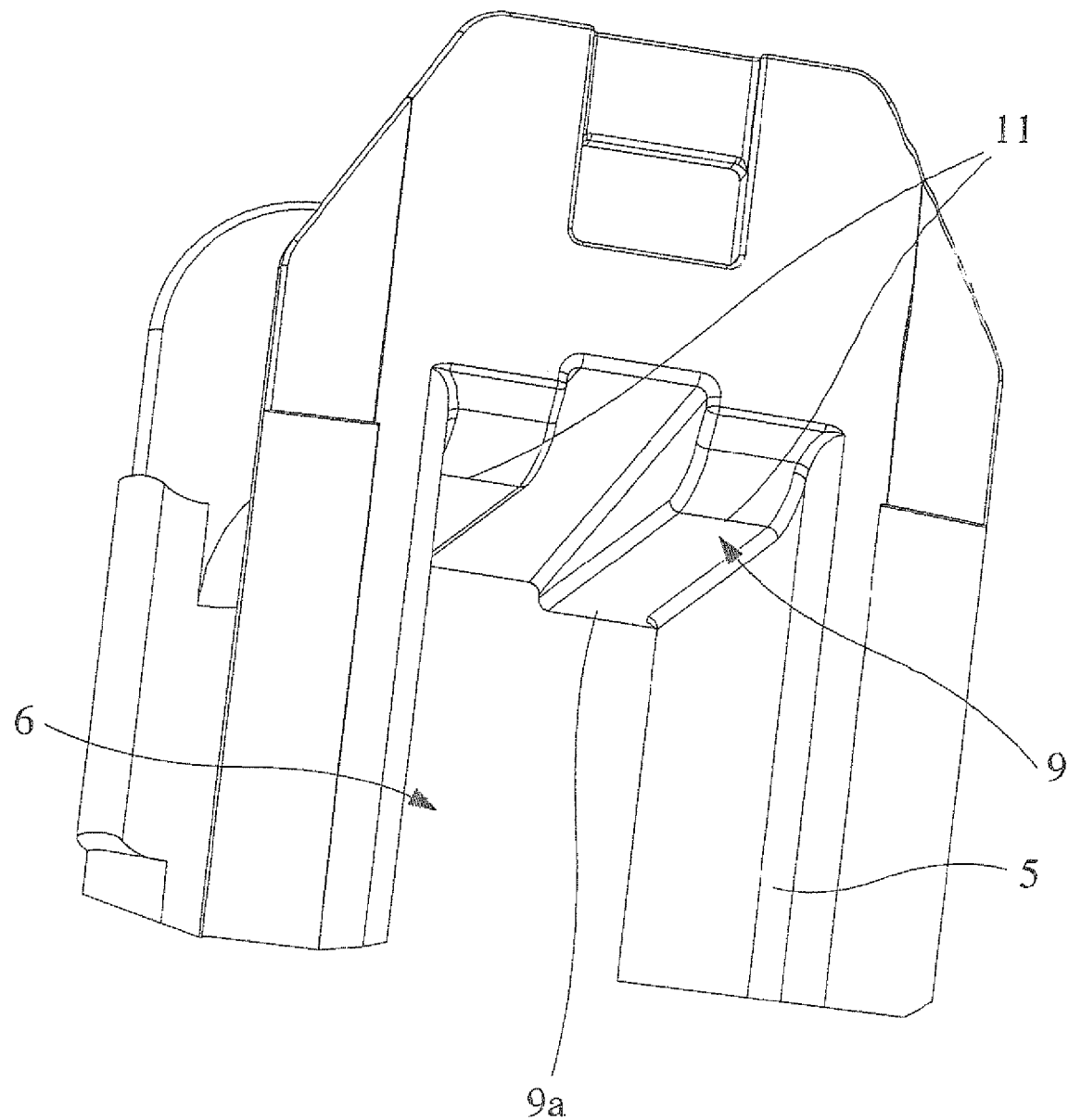
FIG. 4 shows a detailed view of the upper frame section of a coil former as shown in FIG. 1.
Figure 5:
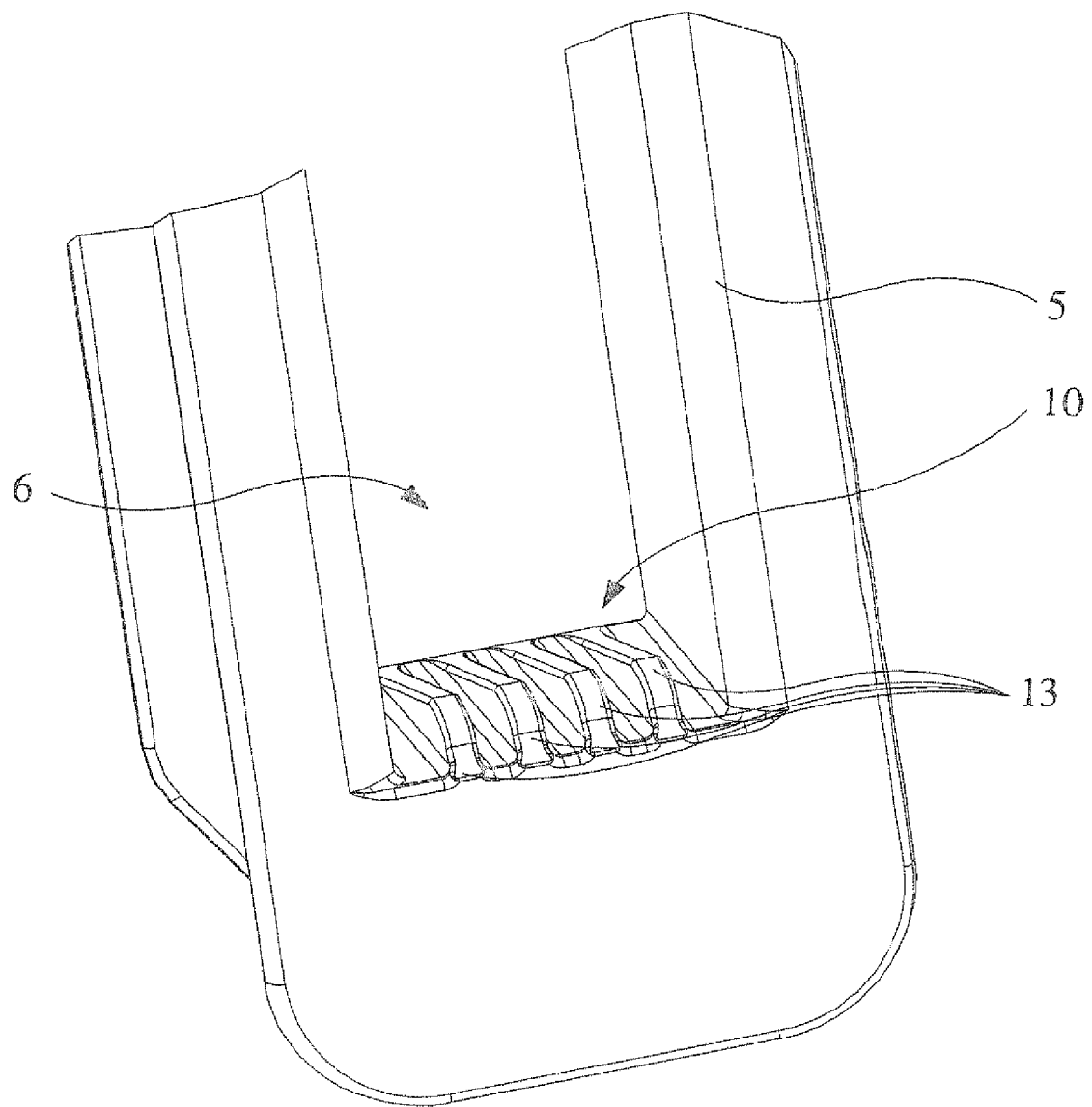
FIG. 5 shows a detailed view of the lower frame section of a coil former as shown in FIG. 1.

The above interlock is admittedly desirable, but it is not absolutely essential. It is essential that the shape of the coil formers 5 on the one hand and of the base body 1 on the other hand leads to the above bracing of the stator laminates 3 during the alignment of the coil formers 5. This can be achieved, for example, in that one of the axially opposite frame internal faces 9, 10 of the coil formers 5 has a pivoting stud 11 over which the coil formers 5 roll during alignment on the base body 1. In this case, this preferably means that the pivoting stud 11 determines the position of the pivoting axis 8 for the pivoting movement during alignment. In the illustrated, and to this extent preferred, exemplary embodiment, a pivoting stud 11 as above is provided, and this can be seen clearly in FIGS. 3 and 4. At the same time, the interlock mentioned above is produced between the coil former 5 and the base body 1 when fitted obliquely, and can also be dispensed with in principle as explained.

It should be noted that the above pivoting movement of the coil formers 5 about a pivoting axis 8 is also intended to cover discrepancies from an ideal pivoting movement, which may be greater or lesser depending on the configuration of the pivoting stud 11.

In the illustrated and to this extent preferred exemplary embodiment, the pivoting stud 11 is arranged on the radially outer area of the respective frame inner face 9 with respect to the motor axis 2. This eccentric arrangement of the pivoting stud 11 makes it possible, in particular, to ensure that the rolling of the coil former 5 on the coil former holder 7 over the pivoting stud 11 also leads to axial lifting of the frame inner face 9, which has the pivoting stud 11, in this case of that part 9a of this frame inner face 9 which is adjacent to the pivoting stud 11, with respect to the base body 1, and therefore to bracing of the stator laminates 3.

In principle, a pivoting stud 11 as above can also be provided on the base body 1. For example, a corresponding pivoting stud 11 can be forced out from the stator laminates 3 by stamping and bending.

The illustration in FIG. 3 shows that, for alignment of the coil former 5 there, an essentially radial alignment force A is applied from the outside to the frame section thereof which is remote from the pivoting axis, producing a resultant clamping force S which acts on the base body 1 from the frame section which is remote from the pivoting axis. The illustration in FIG. 3 shows in particular that, with respect to the pivoting axis 8, the lever arm a which is associated with the alignment force A is considerably greater than that of the lever arm s which is associated with the clamping force S. In particular, the factor between the lever arms a, s is greater than 2, in particular greater than 3. This allows a high clamping force S, which acts on the base body 1, to be produced with a comparatively small alignment force A.

FIG. 3 also shows that the frame inner face 10 which is opposite the pivoting stud 11 has a further stud 13, which is referred to in the following text as a "clamping stud". The two studs 11, 13 are arranged radially offset with respect to one another with respect to the motor axis 2, thus resulting in the capability to fit the coil formers 5 obliquely.

For tolerance compensation and/or for fixing of the coil former 5, the invention preferably provides that the alignment of the coil formers 5 involves plastic and/or elastic deformation of the base body 1 and/or of the respective coil former 5. In this case, preferably, the coil formers 5 are in any case designed to be flexible on the frame inner face 10 which is opposite the pivoting stud 11, for tolerance compensation and/or for fixing of the coil formers 5 in the final position, and in particular have crushing ribs 13. In the illustrated, and to this extent preferred, exemplary embodiment, the clamping studs 13 are each in the form of crushing ribs. However, it is feasible for the pivoting studs 11 additionally or alternatively to be in the form of crushing ribs.

Depending on the configuration, the solution according to the proposal makes it possible in particular to make use of the spring characteristics of the base body 1, which is composed of the stator laminates 3, and/or of the coil formers 5, in order to compensate for axial tolerances which occur over the life of the stator. This ensures a long stator life.

It should also be noted that the bracing according to the proposal is particularly advantageous in the illustrated and to this extent preferred exemplary embodiment. This is because, in this case, not every stator laminate 3 forms a circumferential ring. For example, it is possible for only every third stator laminate 3 to form a circumferential ring, such that the stator laminates 3 which are not circumferential form corresponding openings in the base body 1, which are used for optimized guidance of the magnetic flux. Since the stator laminates 3 which form the above openings are not intrinsically robust in comparison to the circumferential stator laminates 3, secure axial bracing is particularly important here. To this extent, the solution according to the proposal is very particularly advantageous here.

According to a further teaching, which is important in its own right, an electric motor having the above stator is claimed. Reference is made to the above statements relating to the stator according to the proposal, in their entirety.

According to a further teaching, which is likewise important in its own right, the method described above for production of a stator is claimed per se. Reference is likewise made to the above statements.

The invention claimed is:

1. A stator for an electric motor comprising:
   a base body composed of stator laminates which are axially in layers with respect to a motor axis; and
   a number of frame-like coil formers which are fitted with stator windings, with the coil cross-sectional surfaces essentially being directed at the motor axis;
   wherein the coil formers are configured to be first placed obliquely with respect to a final position on coil former holders of the base body and then aligned in the final position;
   wherein the arrangement is designed such that the alignment involves axial bracing of the stator laminates;
   wherein each coil former comprises axially opposite frame internal faces; and
   wherein at least one of the internal faces comprises a rolling member shaped to enable rolling of the coil former on a coil former holder during alignment on the base body.

2. The stator according to claim 1, wherein the coil former holders additionally project from the base body, essentially in the form of a star with respect to the motor axis.

3. The stator according to claim 1, wherein, when the coil formers are first fitted, the coil cross-sectional surfaces are each inclined with respect to the motor axis, and/or, in the final position, the coil cross-sectional surfaces run essentially parallel to the motor axis.

4. The stator according to claim 1, wherein, when the coil formers are first fitted, the axially opposite frame internal faces of each of the coil formers engage essentially in an interlocking manner with the coil former holders.

5. The stator according to claim 1, wherein the coil formers are elongated and, in the final position, extend parallel to the motor axis.

6. The stator according to claim 1, wherein the rolling member comprises a pivoting stud over which the coil formers roll during alignment on the base body and wherein the coil formers are configured such that alignment of each coil former involves a pivoting movement about a corresponding pivoting axis aligned essentially at right angles to the motor axis.

7. The stator according to claim 6, wherein the rolling of the coil formers on the respective coil former holder over the pivoting stud leads to axial lifting of the frame internal face having the pivoting stud, in addition with respect to the base body, and therefore to bracing of the stator laminates.

8. The stator according to claim 6, wherein an alignment force, which is applied for alignment to a frame section which is remote from the pivoting axis, causes a resultant clamping force, which acts on the base body from the frame section which is remote from the pivoting axis.

9. The stator according to claim 8, wherein, with respect to the pivoting axis, a lever arm which is associated with the alignment force is greater than a lever arm which is associated with the clamping force.

10. The stator according to claim 6, wherein the frame internal face which is axially opposite the pivoting stud has a clamping stud, and the pivoting stud and the clamping stud are arranged radially offset with respect to one another, with respect to the motor axis.

11. The stator according to claim 1, wherein the alignment involves plastic and/or elastic deformation of the base body and/or of the respective coil former.

12. The stator according to claim 1, wherein the coil formers are flexible.

13. An electric motor comprising a stator, the stator comprising
   a base body composed of stator laminates which are axially in layers with respect to the motor axis, and
   a number of frame-like coil formers which are fitted with stator windings, with the coil cross-sectional surfaces being directed essentially at the motor axis;
   wherein, in order to fit them, the coil formers are configured to first be placed obliquely with respect to a final position on coil former holders of the base body and then aligned in the final position;
   wherein the arrangement is designed such that the alignment involves axial bracing of the stator laminates;
   wherein each coil former comprises axially opposite frame internal faces; and
   wherein at least one of the internal faces comprises a rolling member shaped to enable rolling of the coil former on a coil former holder during alignment on the base body.

14. A method for production of a stator for an electric motor, the method comprising:
   providing a stator for an electric motor, the stator having a base body composed of stator laminates which are axially in layers with respect to a motor axis and having a number of frame-like coil formers which are fitted with stator windings, with the coil cross-sectional surfaces of the stator windings essentially being directed at the motor axis;
   placing the coil formers obliquely with respect to a final position on coil former holders of the base body; and
   aligning the coil formers in the final position, the alignment comprising axial bracing of the stator laminates, and rolling the coil former on to the coil former holder;
   wherein each coil former comprises axially opposite frame internal faces; and
   wherein at least one of the internal faces comprises a rolling member shaped to enable rolling of the coil former on a coil former holder during alignment on the base body.

15. The stator according to claim 5, wherein the coil former holders are essentially cuboid.

16. The stator according to claim 6, wherein the pivoting stud determines the position of the pivoting axis for the pivoting movement during alignment.

17. The stator according to claim 16, wherein the pivoting stud is arranged on the radially outer area of the respective frame internal face with respect to the motor axis.

18. The stator according to claim 9, wherein the lever arm associated with the alignment force is greater than the lever arm associated with the clamping force by a factor that is greater than 2.

19. The stator according to claim 1, wherein at least one of the internal faces is inclined.

20. The stator according to claim 19, wherein both of the internal faces are inclined.

21. The stator according to claim 19, wherein one of the internal faces is inclined toward the motor axis and one of the internal faces is inclined away from the motor axis.

* * * * *